Jan. 23, 1968     D. H. PRUTTON     3,364,712
TURRET PRESS

Filed July 21, 1965     3 Sheets-Sheet 1

INVENTOR.
DANIEL H. PRUTTON
BY
ATTORNEYS

Jan. 23, 1968     D. H. PRUTTON     3,364,712

TURRET PRESS

Filed July 21, 1965     3 Sheets-Sheet 3

INVENTOR.
DANIEL H. PRUTTON
BY
ATTORNEYS

United States Patent Office 3,364,712
Patented Jan. 23, 1968

1

3,364,712
TURRET PRESS
Daniel H. Prutton, Rte. 1, Box 333,
Englewood, Fla. 33533
Filed July 21, 1965, Ser. No. 473,687
8 Claims. (Cl. 72—191)

ABSTRACT OF THE DISCLOSURE

The invention relates to a turret press with multiple slides moving along paths of minor chords on a turret. Each slide cooperates with a die to form a straight rod into a U-bolt workpiece. Each slide is moved by a stationary annular cam acting on a cam follower end of a lever journalled in the turret, and the lever acts on a gear and rack to reciprocate the slide. The turret is a flywheel to store energy and the workpieces are formed by one complete revolution of the turret.

---

The invention relates in general to a turret press and more particularly to a press having a rotatable turret with a press unit thereon to act on a workpiece as the turret is rotating.

Many presses such as punch presses, forming presses and the like have been constructed but the usual form is to have a slide or press ram which moves generally vertically downwardly to act on a workpiece, either punching or shaping it. The press ram must retract upwardly to permit the workpiece to be removed and a new bank placed in position at an operating station. This is a reciprocatory motion which is only utilizing the maximum power of the press a short portion of the total cycle, usually considerably less than 180 degrees and often approaching only about 60 degrees. Accordingly, the full capacity of the power unit of the press is not utilized and the parts produced by the press are not produced in rapid succession, considering the speed of motion of the press ram and the power capacity of the press.

An object of the invention is to obviate the above disadvantages.

Another object of the invention is to provide a turret press with a plurality of press units on a rotatable turret.

Another object of the invention is to provide a turret press with one or more press units on a turret, each press unit operating with the rotation of the turret and utilizing the flywheel effect of the turret for energy storage and utilization.

Another object of the invention is to provide a turret press with a plurality of press units on the turret, each operating on a workpiece or workpieces to utilize in succession the maximum power capacities of the press several times during each revolution of the turret.

Another object of the invention is to provide a turret press to produce a plurality of workpieces for each revolution of the turret.

Another object of the invention is to provide a turret type U-bolt bender to bend a plurality of U-bolts in each revolution of a turret by means of plural press unit type benders on the turret.

The invention may be incorporated in a turret press including a rotatable turret journalled on a frame, a press unit on said turret having an operating station, a movable press ram on said turret at said operating station, die block means on said turret for cooperation with said press ram, means to actuate said press ram at least upon rotation of said turret, and means to rotate said turret first to move said press ram thereon toward said die block means to operate on a workpiece at said operating station, and second to return said press ram away from said die block means.

2

Other objects and a fuller understanding of this invention may be had by referring to the following description and claims, taken in conjunction with the accompanying drawings, in which:

Figure 1:
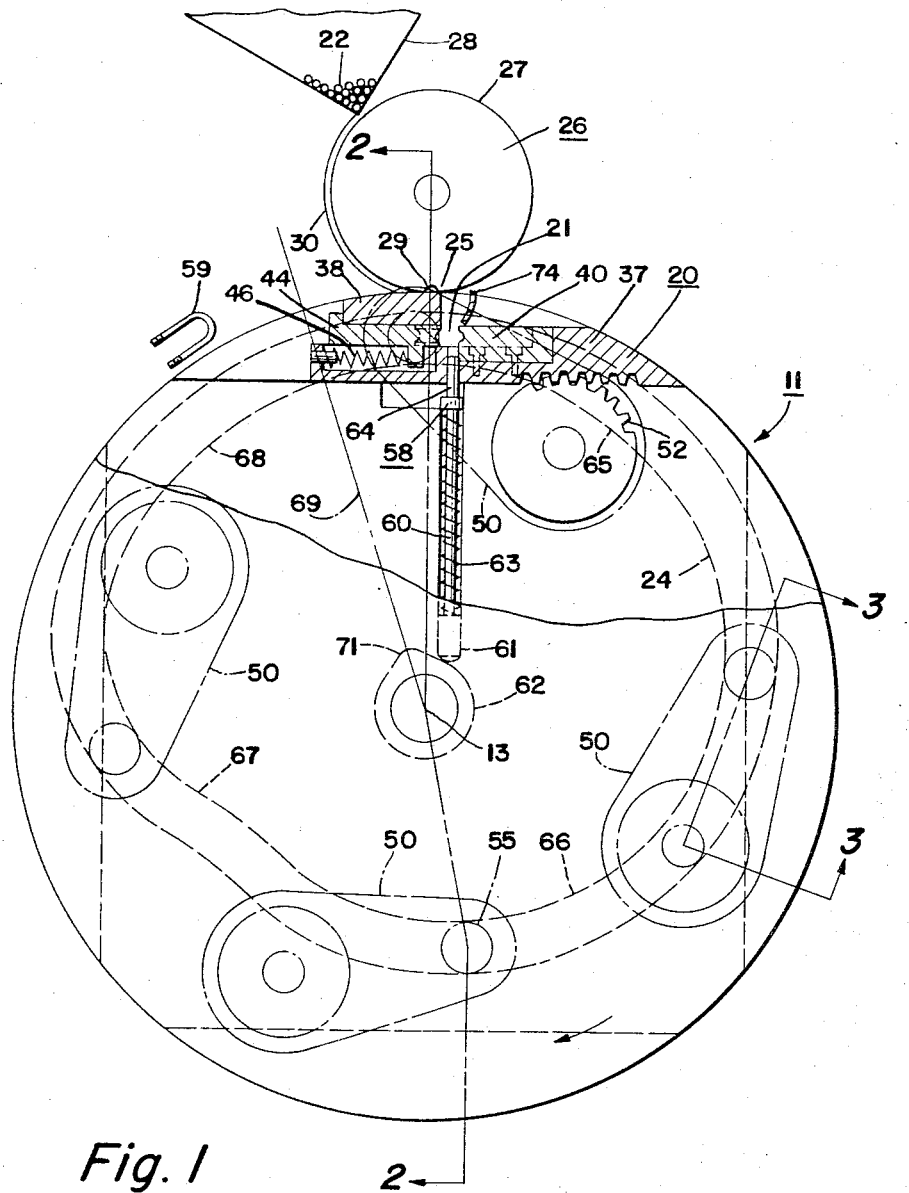
FIGURE 1 is a front elevation view, partially in section, of a machine embodying the invention.
Figure 2:
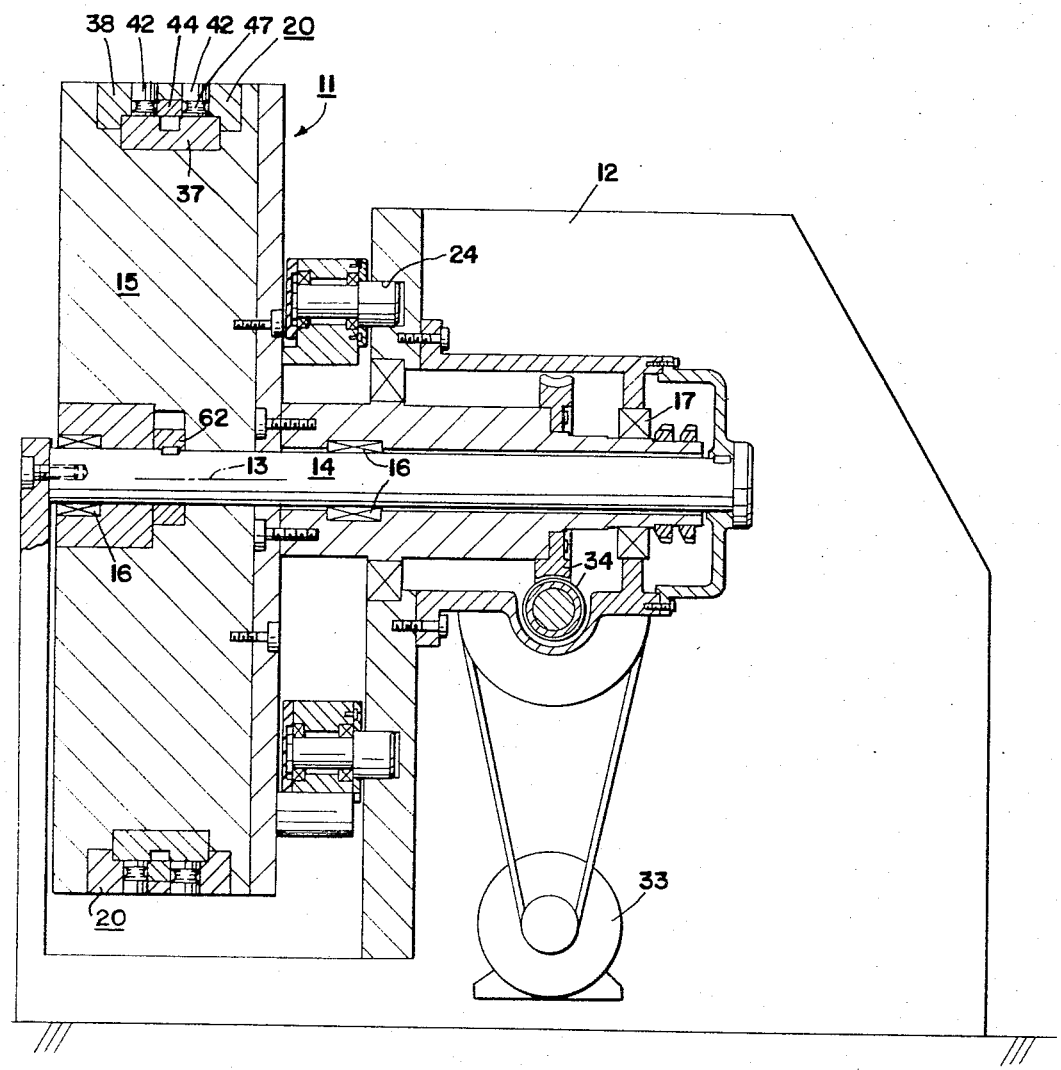
FIGURE 2 is a longitudinal sectional view through the machine of FIGURE 1.
Figure 3:
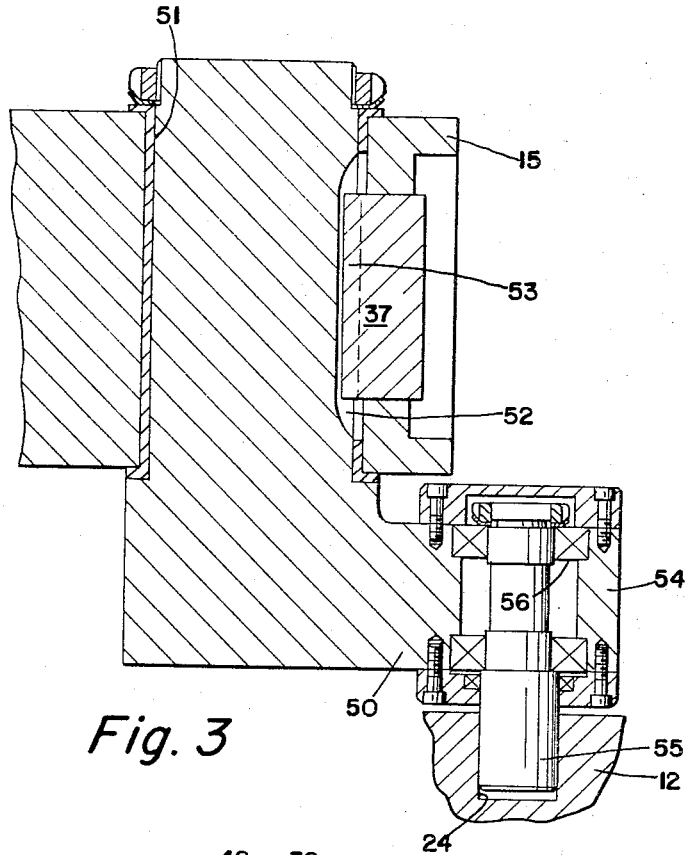
FIGURE 3 is an enlarged sectional view on line 3—3 of FIGURE 1.
Figure 4:
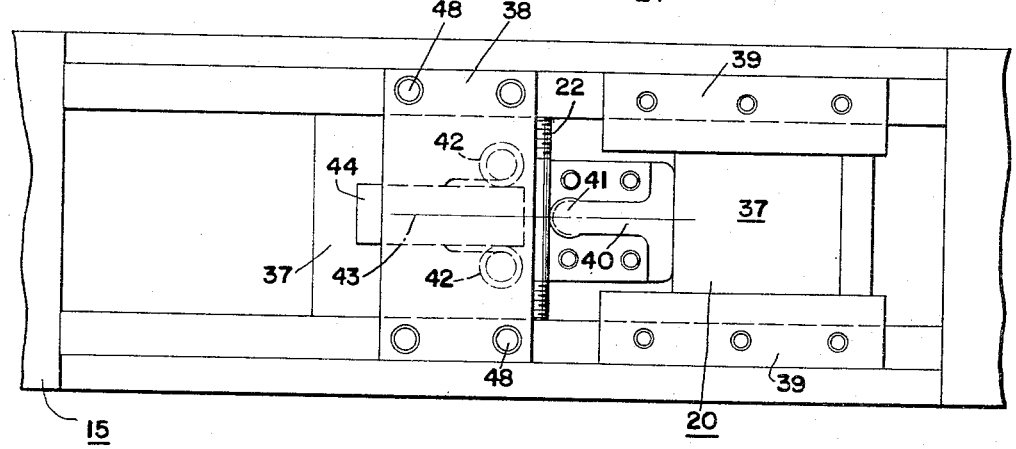
FIGURE 4 is an enlarged partial top plan view of the machine turret showing a single press unit.

The invention may be incorporated in a turret press 11 which as one specific example, but not by way of limitation, illustrates a U-bolt bender. The turret press 11 has a frame 12 with a central axis 13. This axis may be disposed vertically, horizontally or at any angle, and in the figures it is illustrated as being horizontal. The frame carries a central stationary shaft 14 on which is journalled a rotatable flywheel turret 15. The turret 15 is journalled on bearings 16 on the shaft 14, and on bearings 17 relative to the frame 12.

The turret 15 has at least one and preferably a plurality of press units 20 thereon, all of which may be identical. Each of these press units has similar parts with identical reference numerals and only one is shown and described in detail in FIGURE 1. Each press unit 20 has an operating station 21 at which work is performed on a workpiece blank 22.

The frame 12 carries cam means 24 illustrated as an annular stationary cam slot surrounding the central axis 13. Also, a loading station 25 is provided for the turret press 11 and as better illustrated in FIGURE 1, this may be generally at the top of the machine. A feeding means 26 is provided at this loading station 25 to feed workpiece blanks 22 to the operating stations 21 in succession. FIGURE 1 shows that there may be four such press units and, accordingly, four operating stations, although this number may vary with the size and function of the machine. The feeding means 26 may be one of many conventional forms and as shown includes a feed drum 27 receiving straight blanks 22 from a hopper 28. These workpiece blanks may previously have been threaded on both ends in order to have a completed U-bolt after the bending operation. The workpiece blanks 22 are fed from the hopper 28 into a groove 29 on the feed drum 27. They are held in the groove by a shield 30. Means is provided to drive the feed drum 27 at the same peripheral speed as the turret 15 and, accordingly, the workpiece blanks 22 are dropped into the operating station 21 in a synchronized manner. A motor 33 may be provided to drive through gears 34 to rotate the turret 15 at a suitable speed, for example, 50 r.p.m. This same motor may drive the feed drum 27 through a suitable drive train.

Each press unit 20 includes generally a slide 37 and a die block 38. The slide 37 is disposed near the periphery of the turret 15 and is mounted in ways 39 to slide along a path which may be a minor chord of the periphery of the turret 15, as distinguished from a diametrical chord. The slide 37 carries a die 40 which, in this case of a U-bolt bender, has a rounded nose 41. The die 40 as mounted on the slide 37 may be considered a press ram or punch ram to act on a workpiece 22 at the operating station 21, by cooperation with the die block.

The die block 38 is disposed at the operating station 21 to absorb the force of the press ram 40. This die block 38 is fixed on the turret 15 by bolts 48. In this case of the U-bolt bender, the die block journals two bending rollers 42 on each side of the path 43 of movement of the press ram 40. A die cushion 44 is also mounted between the slide 37 and the die block 38 for sliding movement parallel to the path 43. This die cushion is urged by a compression spring 46 toward the right in FIGURE 1 and toward the press ram 40. A portion of this die cushion 44 extends between the bending rollers 42. In this specific embodiment of a U-bolt bender the bending rollers 42 have semi-circular grooves 47 therein to receive half the periphery of the workpiece blank 22.

A lever arm 50 is provided for each press unit. This lever arm has a first end 51 journalled in the turret 15. This first end has a gear segment 52 thereon which meshes with rack teeth 53 on the inner surface, that is, the surface toward the axis 13. The lever arm 50 has a second end 54 journalling a cam follower 55 on bearings 56. This cam follower 55 is disposed in the cam slot 24.

Each press unit also includes ejection means 58 to eject a completed workpiece 59. This ejection means 58 includes a plunger 60 disposed generally radially in the turret 15 at each of the operating stations 21. The inner end 61 of this plunger co-acts with a stationary cam 62 along the axis 13 and a compression spring 63 urges the plunger 60 against the cam 62. Plunger 60 in turn acts on a secondary plunger 64 carried in the slide 37 when this slide is retracted.

The main cam slot 24 has four different portions which may be termed the load, forward or bend, return and ejection portions, 65–68 respectively. As an illustration, the zero point of the cycle may be along a reference line 69. The loading portion 65 may take place through an arc of about 55 degrees clockwise from the reference line 69, assuming clockwise rotation of the turret 15, the bend portion 66 may be the next 210 degrees of arc, the return portion 67 may be the next 70 degrees of arc and the ejection portion 68 may be the last 25 degrees of arc. It is during this ejection portion 68 that a lobe 71 on the ejection cam 66 actuates the ejection means 58.

*Operation*

The motor 33 drives the turret 15 at a suitable rotational speed, for example 50 r.p.m. The turret 15 is a heavy turret and acts as a fly-wheel to store energy so that this energy may be returned to each of the press units 20 in sequence so as to easily form a plurality of completed workpieces 59 during each revolution of the turret 15. In the turret press illustrated, four workpieces 59 are completed during each revolution of the turret 15.

The feeding means 26 illustrates one suitable means of feeding workpiece blanks 22 to each of the operating stations 21 of the press units 20. A guide 74 may help direct the blanks 22 into these operating stations. The blanks 22 are fed in properly timed sequence to reach the respective operating station during the time the loading portion 65 of the cam 24 is acting on the lever arm 50. As the turret 15 rotates clockwise, as viewed in FIGURE 1, the first 55 degrees of arc, during the loading portion 65, preferably provides little or no forward stroke of the press ram 40. During the forward or bending portion 66 of the cam slot 24, however, the slide 37 is moved forwardly toward the die block 38. This is the portion during which the press ram 40 cooperates with the die block 38 to operate on the workpiece blank 22.

During the forward portion 66 the cam slot 24 approaches the central axis 13. This forces the cam follower 55 toward the axis 13 rotating the gear segment 52 counter clockwise and moving the slide 37 to the left, as viewed in FIGURE 1. This is a force amplification type of lever arm 50, because the distance between the cam follower 55 and the axis of the gear segment 52 is considerably greater than the distance between the teeth on the gear segment 52 and the axis thereof. As shown with these two lever arms at about right angles, this is a form of a bell crank lever. Other suitable linkage means may be provided between the lever arm 50 and the slide 37 to cause sliding movement thereof with arcuate movement of the lever arm 50.

As shown in this specific embodiment, the rounded nose 41 of the punch or die 40 bends the straight blank 22 into a U shape. The substitution of suitable punches and dies will permit forming hexagonal heads on workpieces, trimming round heads into square or hexagonal shape or punching holes in a workpiece, or any other punching or press operation. During this forward stroke the die cushion 44 moves rearwardly. Next, the return stroke of slide 37 is effected by the return portion 67 on the cam slot 24. This may be for about 70 degrees, as an example.

The return portion 67 of cam slot 24 returns the cam follower 55 outwardly away from axis 13 and this moves the slide 37 back to the right as viewed in FIGURE 1. This retracts the press ram 40 from between the bending rollers 42. The die cushion 44, as urged by the spring 46 causes the completed U-bolt 59 to follow along with the press ram 40. During the final portion or ejection portion 68 of the cam slot 24, the slide 37 is relatively stationary. During this portion the lobe 71 on the eject cam 62 actuates the ejection means 58 to eject the completed workpiece 59. This may be at about the 11 o'clock position as viewed in FIGURE 1.

It will be observed that the turret press 11 will actuate each of the press units 20 in sequence through the aforementioned cycle so that for each revolution of the turret 15 there are as many workpieces completed as there are press units 20. With four such press units and at 50 r.p.m., this turret press 11 will complete 200 workpieces per minute.

It will be observed that the most force is required for each press unit usually during the last 60 to 90 degrees of a 360-degree cycle of the press ram. This is the last 60 to 90 degrees where the press ram reaches its most forward portion of the stroke. Accordingly, with any plurality of press units on the turret press, the point of maximum application of power for each press unit will not be identical and, further, these portions of maximum application of force come in sequence to more evenly distribute the load on the motor 33. Still further, the flywheel action of the turret 15 smooths out the power impulses to achieve a more smoothly operating turret press 11. Thus, a better balanced machine and one with a high rate of production is achieved because of the press units 20 being mounted on and rotating with the flywheel turret 15.

Although this invention has been described in its preferred form with a certain degree of particularity, it is understood that the present disclosure of the preferred form has been made only by way of example and that numerous changes in the details of construction and the combination and ararngement of parts may be resorted to without departing from the spirit and the scope of the invention as hereinafter claimed.

What is claimed is:

1. A turret press comprising, in combination; a frame; a rotatable turret journalled on said frame; a plurality of press units on said turret; each of said press units having an operating station and including, a ram on said turret at said operating station and movable along a path of a minor chord near the periphery of said turret and generally perpendicular to a radius of said turret, and a die block on said turret at said operating station for cooperation with said ram; means to actuate each of said rams at least upon rotation of said turret; and means to rotate said turret first to move said ram thereon to cooperate with said die block to operate on a workpiece at said operating station, and second to return said ram away from said die block to release said completed workpiece.

2. A turret press comprising, in combination, a frame, a rotatable turret journalled on said frame, a press unit mounted on and rotatable with said turret, said press unit having an operating station and including, a press ram on said turret at said operating station and slidable along a path near the periphery of said turret, a bell crank lever arm having a first portion journalled in said turret, linkge means between said lever arm and said press ram to reciprocate same along said path upon movement of said lever arm, a die block on said turret at said operating station for cooperation with said press ram, means to actuate said lever arm at least upon rotation of said turret, and means to rotate said turret first to move said lever arm to move said press ram thereon toward said die block to operate on a workpiece at said operating station, and second to return said press ram away from said die block to release said completed workpiece.

3. A turret press comprising, in combination, a frame, a rotatable flywheel turret journalled on said frame, means to rotate said flywheel turret, a press unit mounted on and rotatable with said turret, said press unit having an operating station and including, a slide on said turret slidable along a path of a minor chord near the periphery of said turret, a lever arm having a first portion journalled in said turret, a press ram fixed on said slide at said operating station, rack and gear linkage means between said lever arm and said slide to reciprocate same along said path upon movement of said lever arm, a die block on said turret at said operating station for cooperation with said press ram, means to actuate said lever arm at least upon rotation of said turret, and forward and return portions on said actuating means first to move said lever arm to move said slide and press ram thereon toward said die block to operate on a workpiece at said operating station, and second to return said press ram away from said die block to release said completed workpiece.

4. A turret press comprising, in combination; a frame; a rotatable flywheel turret journalled on said frame; means to rotate said flywheel turret; a plurality of press units on said turret; each of said press units having an operating station and including, a slide on said turret slidable along a path of a minor chord near the periphery of said turret, a lever arm having a first portion journalled in said turret, a press ram fixed on said slide at said operating station, linkage means between said lever arm and said slide to reciprocate same along said path perpendicular to a radius upon movement of said lever arm, and a die block on said turret at said operating station for cooperation with said press ram; means to actuate each of said lever arms throughout a majority of the rotation of said turret; and forward and return portions on said actuating means first to move said lever arm to move said slide and press ram thereon toward said die block to operate on a workpiece at said operating station, and second to return said press ram away from said die block to release said completed workpiece.

5. A turret press comprising, in combination; a frame; a rotatable flywheel turret journalled on said frame and having a central axis; means to rotate said flywheel turret; a plurality of press units on said turret; annular cam means on said frame surrounding said central axis; each of said press units having an operating station and including, a slide on said turret slidable along a path near the periphery of said turret, a lever arm having a first portion journalled in said turret, a cam follower fixedly carried on a second portion of said lever arm and disposed in engagement with said cam means, a press ram fixed on said slide at said operating station, force amplification linkage means between said cam follower and said slide and including rack and gear means to reciprocate said slide along said path, and a die block on said turret at said operating station for cooperation with said press ram; and forward and return portions on said cam means first to move said lever arm to move said slide and press ram thereon toward said die block to operate on a workpiece at said operating station, and second to return said press ram away from said die block to release said completed workpiece.

6. A turret press comprising, in combination, a frame, a rotatable flywheel turret journalled on said frame and having a central axis, means to rotate said turret, a press unit on said turret having an operating station, an annular stationary cam slot on said frame surrounding said central axis, a loading station on said frame, means at said loading station to feed workpiece to said press unit operating station, said press unit including a slide on said turret slidable along a minor chordal path of said turret, a lever arm having a first portion journalled in said turret, a cam follower fixedly carried on a second portion of said lever arm and disposed in said cam slot, a press ram fixed on said slide at said operating station, linkage means between said lever arm and said slide to reciprocate same along said chordal path, a die block on said turret at said operating station for cooperation with said press ram, means to eject a workpiece from said operating station, and load, forward, return and eject portions on said cam slot first to permit loading at said loading station of a new workpiece into said operating station, second to move said lever arm relative to said central axis to move said slide and press ram thereon toward said die block to operate on a workpiece at said operating station, third to return said press ram away from said die block, and fourth to eject said completed workpiece by said ejection means.

7. A U-bolt bender comprising, in combination, a frame, a rotatable turret journalled on said frame and having a central axis, means to rotate said turret, a slide on said turret slidable along a path of a minor chord of said turret, an annular stationary cam slot on said frame surrounding said central axis, a lever arm having a first portion journalled in said turret, a cam follower fixedly carried on a second portion of said lever arm and disposed in said cam slot, gear and rack linkage means between said lever arm and said slide to reciprocate same along a chordal path generally perpendicular to a radius of said turret, said gear having a smaller radius than the length of said lever arm for a force amplification applied to said slide from said cam slot, a die on said slide having a rounded nose, bending rollers adjacent and on opposite sides of the chordal path of movement of said die, a loading station on said frame, means at said loading station to feed a piece of straight bar stock onto the periphery of said turret between the nose of said die and said bending rollers, means to eject a workpiece from said slide, and load, bend, return and eject portions on said cam slot first to permit loading of a new workpiece into operating position on said slide at said loading station, second to move said lever arm inwardly toward said central axis to move said slide and die thereon toward bending rollers to bend a workpiece therebetween into a U-shape, third to return said die away from between said bending rollers, and fourth to eject said bent U-bolt by said ejection means.

8. A U-bolt bender comprising, in combination, a frame, a central stationary shaft on said frame and having an axis, a turret journalled on said shaft, first, second and third slides on said turret each slidable along a minor chord of said turret, rack teeth on the side of each said slide facing said central axis, an annular stationary cam slot on said frame surrounding said central shaft, means to rotate said turret, a lever arm for each of said slides and each having a first end journalled in said turret, a gear segment fixed on each said first end meshing with the rack teeth of the respective slide, a cam follower fixedly carried on a second end of each of said lever arms and disposed in said cam slot, a die on each said slide having a rounded nose, bending rollers adjacent and on opposite sides of the path of movement of each said die, a loading station on said frame, means at said loading station to feed a piece of straight bar stock onto the periphery of said turret between the nose of each said die and the respective bending rollers, means to eject a workpiece from each said slide, and load, bend, return and eject portions on said cam slot first to permit loading of a new workpiece into operating position on said slide by said feed means, second to move an arm inwardly toward said central axis to move the respective slide and die thereon toward the respective bending rollers to bend a workpiece therebetween into a U-shape, third to return the respective die away from between the repsective bending rollers, and fourth to eject said bent U-bolt by said ejection means.

References Cited

UNITED STATES PATENTS

| | | | |
|---|---|---|---|
| 633,214 | 9/1899 | Perry | 140—112 |
| 1,685,322 | 9/1928 | Scott | 72—403 |
| 2,343,083 | 2/1944 | Proctor | 72—213 |
| 2,424,917 | 7/1947 | Brannock | 72—380 |
| 2,647,552 | 8/1953 | Magnuson et al. | 72—213 |
| 2,872,887 | 2/1959 | Praturlon | 72—191 |

CHARLES W. LANHAM, *Primary Examiner.*

L. A. LARSON, *Assistant Examiner.*